Patented May 27, 1930

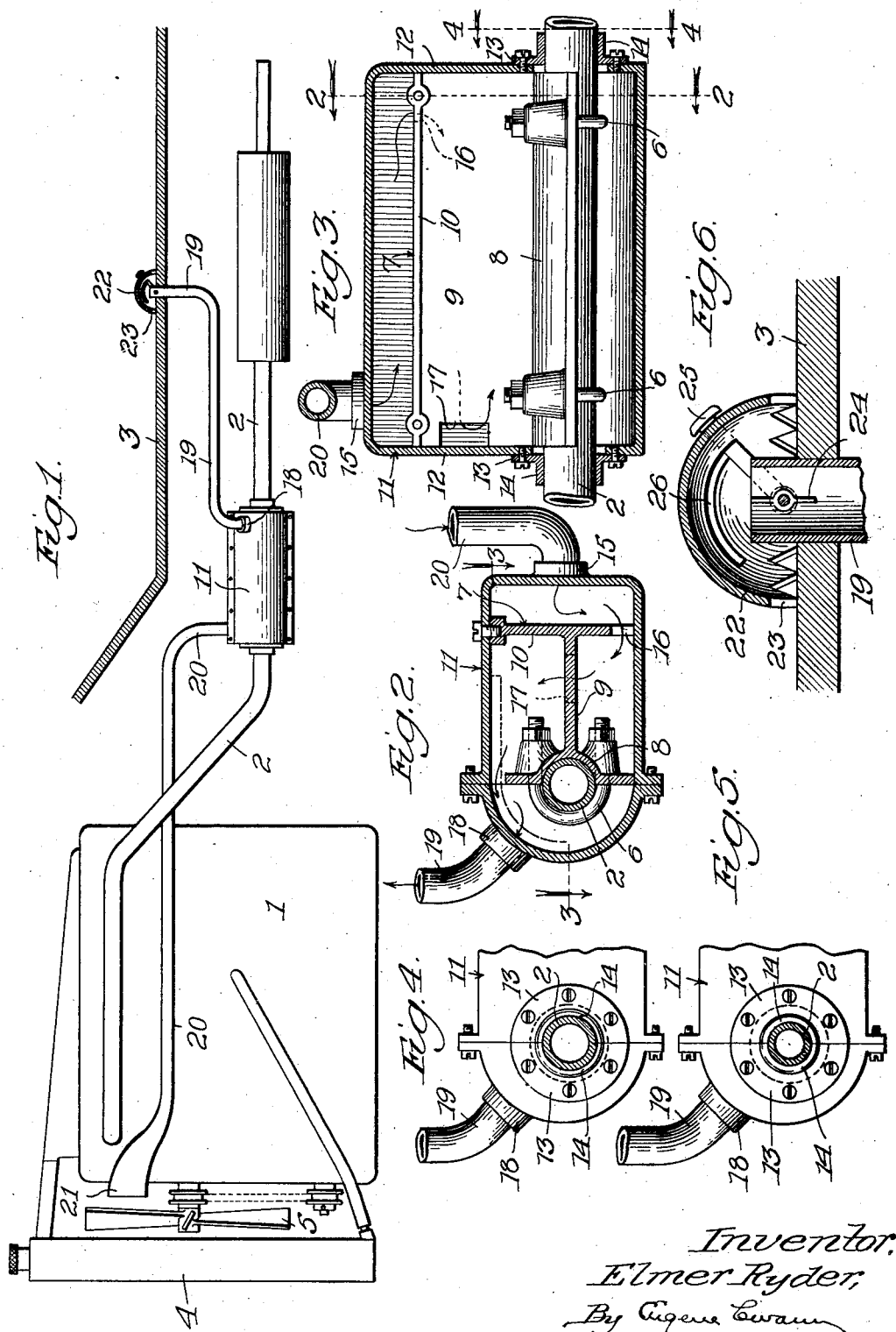

1,760,005

UNITED STATES PATENT OFFICE

ELMER RYDER, OF ELGIN, ILLINOIS

HEATER FOR MOTOR VEHICLES

Application filed January 24, 1927. Serial No. 162,997.

This invention relates to improvements in motor vehicle heating devices, and more particularly to hot air heaters as distinguished from the so-called exhaust heaters.

One of the objects of my invention is to provide an increased heat radiating surface on the portion of the exhaust pipe over which the air is passed before being discharged into the interior of the car body so as to raise the temperature of such air higher than would be possible should the air be passed over the plain exhaust pipe.

Another object of my invention is to produce this heat radiating surface through the use of a cast metal or other enlarged element which is clamped against the exhaust pipe and extends outward therefrom so as to convey heat to the air stream.

A further object of my invention is to locate this heat conducting element in a suitable casing through which the incoming cold air must pass in order to contact with the heating element to be heated thereby.

A still further object of my invention is to so construct this heating element and arrange it in the casing that the air passing through the same must travel over a considerable distance before being discharged into the body of the car in order that the temperature of the air may be raised sufficiently for effective car warming purposes.

The invention consists further in the matters hereinafter described and claimed.

In the accompanying drawings—

Fig. 1 is a side view showing a heater assembly of my invention applied to a motor vehicle;

Fig. 2 is an enlarged vertical cross-sectional view through the heating element and its surrounding casing, taken on line 2—2 of Fig. 3;

Fig. 3 is a longitudinal sectional view taken on line 3—3 of Fig. 2;

Fig. 4 is a cross-sectional view to show the end plates, taken on line 4—4 of Fig. 3;

Fig. 5 is a similar view showing end plates for a smaller exhaust pipe; and

Fig. 6 is a vertical sectional view through the cowl over the discharge end of the pipe leading from the heater casing.

The heater assembly of my invention is employed in combination with the explosion engine 1 of a motor vehicle and its exhaust pipe 2, which extends toward the rear of the car beneath the floor 3 thereof, as in motor vehicle design. Arranged in front of the engine 1 is a radiator 4 forming part of the cooling system of the engine and having to the rear thereof the usual fan 5 for drawing air through the radiator, as customary.

Clamped against a portion of the exhaust pipe 2 to the rear of the engine 1 by U-bolts 6, 6, is a heating element 7 constructed in accordance with my invention. This element is preferably made from cast metal, such as iron, aluminum, brass, or such other material which will rapidly conduct heat from the portion of the pipe 2 against which it is clamped. The element 7 has a base 8 preferably made to fit against the outer contour of the pipe 2 so as to contact therewith and thus have an immediate heat conducting connection with said pipe. Projecting outward from the base 8 is a central web 9, which joins an end web 10 at its outer end, said end web extending on opposite sides of the central web, as shown in Fig. 2.

A casing 11 incloses the heating element 7 and the portion of the exhaust pipe 2 against which said element is clamped. This casing is preferably made in two sections so that they may be bolted together about the pipe 2 and element 7, as shown in Fig. 2. The end walls 12, 12 of the sections have suitable openings for the pipe 2, and are there secured to end plates 13, 13, which close the openings about the pipe, as shown in Figs. 3 and 4. The plates 13 have base flanges 14 to fit about the pipe 2 on the outside thereof and conform to the contour of the same. The openings made in the end walls 12 are large enough to accommodate the largest size of exhaust pipe as encountered on automobiles so that the heater assembly may be made standard or of one general size for substantially all cars. The end plates 13, however, are made in sets with the radii provided for the flanges 14 conforming to the diameters of the various sizes of exhaust pipes so that the required sets of plates may be used for the various pipes in conjunction with one size of heater assembly. In Fig. 5, I have shown a set of end plates for a smaller size of exhaust pipe than shown in Fig. 4. As the exhaust pipes decrease in size from that shown in the drawings, which is the largest, the U-bolts 6 are drawn up to take care of the decrease in diameters.

When the heating element 7 is applied to the pipe 2 so as to extend laterally outward from one side thereof, as shown in the drawings, the central and end webs 9 and 10 divide the casing section in which they are located horizontally and vertically, respectively. This provides air passages on opposite sides of these webs. An air inlet fitting 15 opens into one end of the casing 11 into the passageway provided on the outer side of the end web 10. This passage communicates with the passage below the central web 9 through an opening 16 provided at one of the lower corners of the end web. The central web 9 has an opening 17 at its end opposite the opening 16 so as to communicate the passage below the central web with the one above the same, as shown in Fig. 3. The bolting flange on the upper side of the base 8 terminates short of the upper portion of the casing 11 so as to communicate the passage above the central web with the portion of the casing on the side of the pipe 2 opposite the heating element 7, as shown in Fig. 2. An outlet fitting 18 opens into this section of the casing so as to lead the heated air therefrom into a pipe 19 which extends up through the floor 3 of the car at the point desired, as between the front and rear seats, or in advance of the front seat, as may be required.

The heating element 7 being clamped in contact with the exhaust pipe 2 rapidly conducts heat from said pipe as furnished by the exhausts passing therethrough from the engine 1. The base 8 and the webs 9, 10 with which the element is formed provide the same with a larger heat radiating surface or area than could be otherwise be obtained by the exhaust pipe alone in the length defined by the casing 11.

An air supplying conduit 20 connects with the intake fitting 15 of the casing 11 and extends forward therefrom and has a flared or otherwise enlarged intake end 21 so that air for the heater may be supplied to the casing 11 either by the forward travel of the car or by the fan. In the latter case, the intake end 21 is directly within the air flow created by the fan, as shown in Fig. 1. The air is forced through the casing 11 and is heated in its travel therethrough by contact with the large heating surface of the heating element 7 and by the heat radiated therefrom. The connected passages into which the casing 11 is divided by the element 7 requires that the air have a relatively long travel through the casing 11 before entering the body of the car through the pipe 19, and thus the temperature of the air is raised to a degree considerably higher that if it had a straight uninterrupted path through the casing.

The heated air is prevented from being blown as a single stream into the body of the car by a cowl 22 over the discharge end of the pipe 19. This cowl seats on or is close to the floor of the car and has marginal outlet openings 23 adjacent the floor, as shown in Fig. 1. This distributes the heated air discharged from the pipe 19 and directs it along the floor of the car so as to displace the colder air which tends to lie along the floor.

To completely shut off or control the outflow of heated air from the pipe 19, I provide a damper valve 24 at the discharge end of said pipe. The axis member of said damper has a handle 25 in a slot 26 in the cowl 22 for opening and closing the damper, as shown in Fig. 6.

The details of structure and arrangement of parts shown and described may be variously changed and modified without departing from the spirit or scope of my invention.

I claim as my invention:

1. A motor vehicle heater adapted for use with the exhaust pipe of the vehicle engine, comprising a heating element to be secured to and extend laterally outward from the exhaust pipe to conduct heat therefrom and provide an increased heat radiating surface therefor, and a casing about said element and having a cold air intake and a hot air outlet, said element having horizontal and vertical webs dividing the casing into a plurality of passages having communication through an opening in each of the webs.

2. A motor vehicle heater adapted for use with the exhaust pipe of a vehicle engine, comprising a cast one-piece heating element having a central web and an end web extending on opposite sides of the central web, said element being applied to the exhaust pipe with its end web against the same and with the central web extending outward from said pipe to conduct heat therefrom and provide an increased heat radiating surface therefor, means for securing the element to said pipe, and a casing about said element so that the air to be heated thereby may be passed over and in contact with said webs, said casing having a cold air intake and a hot air outlet.

3. A motor vehicle heater adapted for use with the exhaust pipe of a vehicle engine, comprising a cast one-piece heating element having a central web and end webs at the opposite ends of the central web and extending on opposite sides of the same, said element being applied to the exhaust pipe with one end web against the same and with the central web and the other end web outward from said pipe to provide an increased heat radiating surface therefor, means for securing the element to said pipe, and a casing about said element and having a cold air intake and a hot air outlet, said webs dividing the casing into a plurality of communicating passages for the travel of the air over and in contact with said webs so as to be heated thereby.

4. A motor vehicle heater adapted for use with the exhaust pipe of a vehicle engine, comprising a heater casing having end walls with openings therein through which the exhaust pipe extends, said openings adapted to accommodate pipes of different sizes and being larger than the largest size of exhaust pipe, said casing having a cold air intake and a hot air outlet, and end plates fitted for different sizes of pipe and each of which is adapted to be secured to said end walls adjacent said openings and extending to and fitting about one of such pipes to close the openings, the end plate at each end of the casing being formed in divided sections each of which is removably secured to the adjacent end wall.

5. A motor vehicle heater adapted for use with the exhaust pipe of a vehicle engine, comprising a heater casing having end walls with openings therein through which the exhaust pipe extends, the openings in said walls adapted to accommodate pipes of different sizes and being larger than the largest size of exhaust pipe, said casing having a cold air intake and a hot air outlet, and end plates fitted for different sizes of pipe and each plate being adapted to be removably secured to said end walls adjacent said openings and extending to and fitting about one of such pipes to close the opening.

6. A motor vehicle heater adapted for use with the exhaust pipe of a vehicle engine, comprising a heater casing having end walls with openings therein for the exhaust pipe to extend therethrough, said openings adapted to accommodate pipes of different sizes and being large enough to accommodate an exhaust pipe of the largest diameter, said casing having a cold air intake and a hot air outlet, and end plates fitted for different sizes of pipe and each plate being adapted to be removably secured to said end walls adjacent said openings and extending to and fitting about one of such pipes to close said openings, said plates being made in sets and each having a laterally projecting base flange curved to conform to the contour of the exhaust pipe to fit against the same.

In testimony whereof I affix my signature this 22d day of January, 1927.

ELMER RYDER.